No. 624,763. Patented May 9, 1899.
T. DOWNING.
WHEEL RIM AND TIRE.
(Application filed Oct. 23, 1896.)
(No Model.)
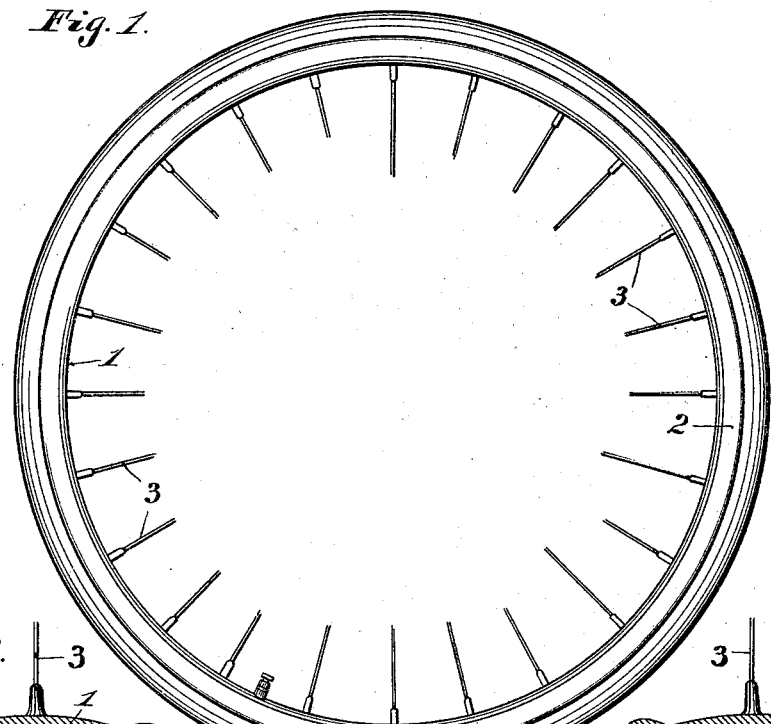
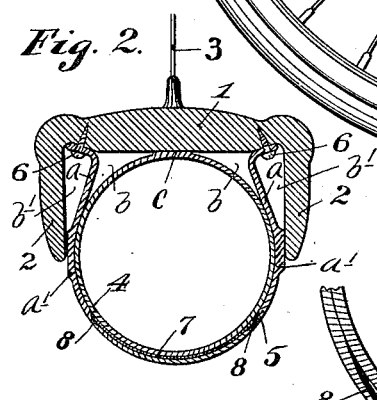
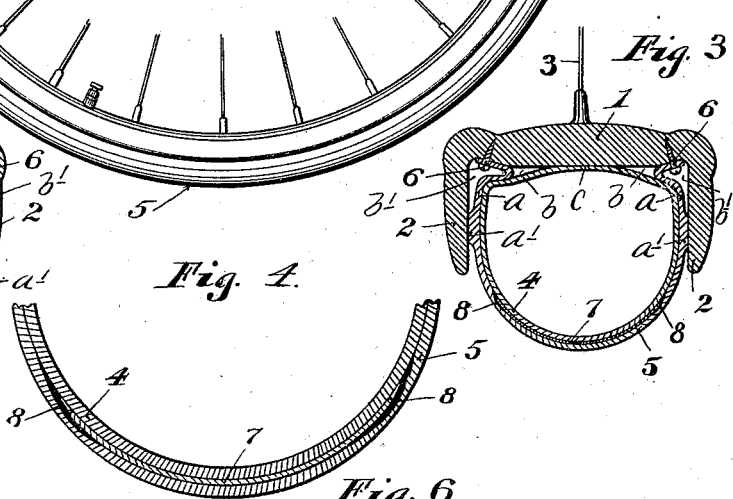
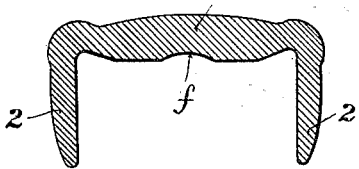
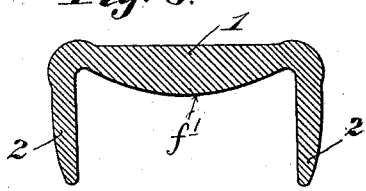
Witnesses.
C. F. Kilgore
F. D. Merchant
Inventor.
Thomas Downing.
By his Attorney,
Jas. F. Williams

UNITED STATES PATENT OFFICE.

THOMAS DOWNING, OF MINNEAPOLIS, MINNESOTA.

WHEEL RIM AND TIRE.

SPECIFICATION forming part of Letters Patent No. 624,763, dated May 9, 1899.

Application filed October 23, 1896. Serial No. 609,831. (No model.)

*To all whom it may concern:*

Be it known that I, THOMAS DOWNING, a citizen of the United States, residing at Minneapolis, in the county of Hennepin and State of Minnesota, have invented certain new and useful Improvements in Wheel Rims and Tires; and I do hereby declare the following to be a full, clear, and exact description of the invention, such as will enable others skilled in the art to which it appertains to make and use the same.

My invention relates to wheel rims and tires, and has for its object to provide a construction whereby a pneumatic tire will be rendered absolutely puncture-proof without interfering with its ordinary resilient or yielding properties.

To this end my invention consists of the novel features hereinafter described, and defined in the claims.

The invention was especially designed for use on bicycles and is so illustrated in the drawings.

In said drawings, Figure 1 is a side elevation, with some parts broken away, of an ordinary cycle-wheel equipped with my improvement or constructed in accordance with my invention. Fig. 2 is a cross-section through the rim and tire without load on the wheel; and Fig. 3 is a similar view of the same parts as they will appear when under load at a cross-section taken directly over the ground contact or supporting-point, with the flattened surface of the tire exaggerated. Fig. 4 is a cross-section, on a larger scale, through a part of the tire detached; and Figs. 5 and 6 are details in cross-section illustrating slightly-modified forms of the tire-rim.

The numerals 1 and 2 represent, respectively, the body and the side flanges, which together constitute my improved tire-rim.

The numeral 3 represents the wheel-spokes, which are secured to the rim in the usual way.

The numeral 4 represents the inner or air tube proper, and 5 represents the outer tube or sheath. The inner tube 4 is of the ordinary construction; but the outer tube or sheath 5 is split at its top for the entire circle, and the separated margins or flaps $a$ are secured to the rim on opposite sides of the center of the same, as clearly shown in Figs. 2 and 3. As illustrated, the sheath flaps or margins $a$ are secured to the rim directly adjacent to the flanges 2 by screws 6; but of course they might be so secured in any other suitable way.

When the parts are in working position, as above described, the inner tube 4 will bear directly against the body 1 of the rim on the center line of the same, and clearance will be afforded between the inner tube 4 and the flaps $a$ of the sheath, as shown at $b$, and between the flaps $a$ and the rim-flanges 2, as shown at $b'$. The inner tube 4 is also shown as slightly thickened up at the point $c$, where the same normally bears against the center of the tire-rim. The sheath or outer tube 5 is also thickened up at the points $a'$, where the same bears against the rim-flanges 2. The inner and outer tubes 4 and 5 may, and probably would, be cemented together for the greater part of the circle—say about two-thirds or five-sixths of the same—but it may be possible to permit the same to be free from each other throughout.

Between the inner and outer tubes in that segment of the tire which would be liable to puncture I place an armor 7 of some puncture-proof material. This armor 7 is preferably made rigid, so as to always maintain its curvature or segmental form. Any material capable of the functions desired may be employed; but I contemplate the use of metal, such as a thin segment of steel, copper, or other metal which I may find best adapted for the purpose. This armor 7 may be cemented either to the inner or the outer tube and is preferably provided with rawhide feather-edged margins 8, which overlie the margins of the armor proper and are cemented to the inner tube, as best shown in Fig. 4. The special purpose of these rawhide margins 8, applied as described, is to prevent injury of the inner tube by buckling over the margins of the rigid armor 7 under the compressing action.

In the form of the tire-rim shown in Figs. 1, 2, and 3 the under surface of the rim-body is straight throughout; but in the modification shown in Fig. 5 the rim-body is provided with a central bearing-surface for the tire-top, which is of concave form in cross-section, as shown at $f$. In the modification of the rim shown in Fig. 6 the under surface of the rim is of convex form, as shown at $f'$.

Having regard now to the action, it is obvious that the rim is of such construction as to permit the tire to flatten against the rim instead of entirely on the ground or supporting-point, as has hitherto been the case. In this action the tire must of course move up and down relative to the rim. Hence the tire must be secured to the rim in such a way as to permit this up-and-down movement of the said parts in relation to each other. The action in respect to flattening against the rim and in respect to the movement of the tire relative to the rim is obvious from an inspection and comparison of Figs. 2 and 3. When the tire is inflated and the wheel is without load, the parts will appear as shown in Fig. 2 at a cross-section through the wheel at the ground contact or point of support; but when the wheel is under load the parts will appear as shown exaggerated in Fig. 3 in a cross-section taken at the corresponding point. Otherwise stated, when the tire is under compression it will move upward or the rim downward and on account of the clearance afforded will flatten against the rim instead of entirely on the ground. In virtue of the armor 7 being of such a character as to maintain its form the tire will not flatten any whatever, or, at least, not to any material extent, at the ground contact; but, on the contrary, the outer half of the tire will maintain its circular form, while only the inner segment will flatten or spread under the compressing action. It will therefore be seen from the foregoing statements that even without the armor 7 the amount of tire-surface brought in contact with the ground would be greatly reduced as compared with the ordinary construction, and hence, even without the armor 7, the liability to puncture would be correspondingly reduced. In the absence of the armor 7 the flattening would of course be divided between the rim and the ground, thereby reducing the liability to puncture fifty per cent. With the use of the armor 7, which of course is my preferred construction, the tire cannot be punctured at all and the ground contact is reduced to a minimum, being simply a tangent to the circle of the tire in its normal or distended condition. On the other hand, the use of the rigid armor 7 does not interfere with the resiliency of the wheel or tire, because the tire and the rim are free to move in respect to each other and the tire can flatten against the rim, as hitherto noted. It is thought, therefore, that in virtue of this invention an absolutely puncture-proof tire is afforded without interfering in any way with the well-known advantages of the ordinary pneumatic tire.

In virtue of the rim-flanges 2 the tire is guided in its up-and-down movement and the flattening is confined entirely to the upper segment of the tire. It will be noted that the said rim-flanges 2 are of a length to reach slightly below the center of the tire when distended, and hence there is no tendency to buckle the tire around the lower ends of the said guide-flanges 2 under the compressing action.

In virtue of the tire being secured to the rim by the margins or flaps $a$ of the split sheath or outer tube 5 at points on opposite sides of the center of the rim and tire it follows that the rim and the wheel will not slip or turn sidewise in respect to the tire. When the two tubes 4 and 5 are cemented or otherwise secured together up to the outer limits of the upper or flattening segment, it is not possible for the rim and wheel to turn on the inner tube of the tire, because the pull on opposite sides of the center is in opposite directions and equal, and even when the two tubes are not thus cemented or secured together it is thought that the wheel and rim will not turn on the inner tube.

In virtue of the feather-edged rawhide margins 8 to the armor-segment 7, applied as described, it is thought that the slight tendency of the inner tube to buckle over the armor edges will be reduced to such an extent as not to have any injurious effect on the said tube. The wear and tear on the outer sheath or tube 5 by the rim-flanges 2 is compensated for by the increased thickness of the sheath at that point, as shown at $a'$. The buckling or bellows action of the flaps $a$ of the sheath or outer tube 5 under the compressing and distending action of the tire, it is thought, can be sustained without liability to breakage or serious injury thereto when the said sheath is made of proper material. Injury from the strain on the said flaps $a$ at their upper margins or points, where secured by the screws 6, may be guarded against by reinforcing the margins of the said flaps in any suitable way.

I believe myself to be the first or pioneer to provide a wheel-rim of any kind for coöperation with pneumatic tires which will permit the tire to flatten against the rim under the compressing action, and hence I desire to claim the same herein in the broadest possible way.

It will be understood that the details of the construction may be varied and that the principle of the invention is capable of a wide range of modification. For example, it is probable that the rim flanges or guides 2 might be dispensed with, although they are serviceable, as stated, and are of especial value for preventing displacement of the tire laterally when making sudden turns with the wheel.

What I claim, and desire to secure by Letters Patent of the United States, is as follows:

1. The combination with a wheel-rim constructed to permit the tire to flatten against the rim, under the compressing action, and provided with side flanges which engage said tire, of a pneumatic tire secured to said rim with freedom for up-and-down movement relative thereto, and a puncture-proof armor embedded in the outer segment of said tire, which armor is of segmental form and composed of sufficiently rigid material to maintain its form when the tire is under load, substantially as described.

2. The combination with the wheel-rim 1 having the flanges 2, of the tire composed of an inner tube 4 and a sheath or outer tube 5 which sheath is divided or split and has its margins or flaps *a* secured to the rim, on opposite sides of the center of the same, and the puncture-proof armor 7 composed of metal or other rigid material secured between the said tubes at the outer segments thereof and provided with the rawhide margins 8, all for coöperation substantially as described.

In testimony whereof I affix my signature in presence of two witnesses.

THOMAS DOWNING.

Witnesses:
  JAS. F. WILLIAMSON,
  BESSIE B. NELSON.